(12) United States Patent
Nakao

(10) Patent No.: US 10,859,959 B2
(45) Date of Patent: Dec. 8, 2020

(54) IMAGE FORMING APPARATUS

(71) Applicant: KYOCERA Document Solutions Inc., Osaka (JP)

(72) Inventor: Mitsutoshi Nakao, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 209 days.

(21) Appl. No.: 16/305,352

(22) PCT Filed: May 24, 2017

(86) PCT No.: PCT/JP2017/019366
§ 371 (c)(1),
(2) Date: Nov. 28, 2018

(87) PCT Pub. No.: WO2017/208931
PCT Pub. Date: Dec. 7, 2017

(65) Prior Publication Data
US 2020/0292976 A1 Sep. 17, 2020

(30) Foreign Application Priority Data

May 31, 2016 (JP) ................................ 2016-108499

(51) Int. Cl.
*G03G 15/00* (2006.01)
(52) U.S. Cl.
CPC ................ *G03G 15/5016* (2013.01)
(58) Field of Classification Search
CPC .................................................. G03G 15/5016
See application file for complete search history.

(56) References Cited

FOREIGN PATENT DOCUMENTS

| JP | 2001080244 A | * | 3/2001 |
| JP | 2012-018695 A | | 1/2012 |

OTHER PUBLICATIONS

English machine translation of JP2001080244A (Year: 2001).*

* cited by examiner

*Primary Examiner* — Walter L Lindsay, Jr.
*Assistant Examiner* — Geoffrey T Evans
(74) *Attorney, Agent, or Firm* — Studebaker & Brackett PC

(57) ABSTRACT

An image forming apparatus (1) includes a display (20), a detector (30), a determination section (101), a processing section (102), and an image forming section (140). The display (20) displays an image exhibiting a seating chart including a plurality of seat images. The detector (30) detects a first movement trace of a detection target on the display (20). The determination section (101) determines an order of the plurality of seat images based on the first movement trace. The processing section (102) processes an original document image to generate a plurality of output images respectively corresponding to the plurality of seat images. The image forming section (140) forms the plurality of output images on a plurality of sheets, respectively, in accordance with the order determined by the determination section (101). At least two output images of the plurality of output images are at least partially different from each other.

9 Claims, 18 Drawing Sheets

IMAGE FORMING APPARATUS

TECHNICAL FIELD

The present invention relates to an image forming apparatus.

BACKGROUND ART

An image forming apparatus described in Patent Literature 1 has a function of registering "print settings" configured by a user for printing as a "favorite". The image forming apparatus described in Patent Literature 1 allows print settings to be configured by simplified operation. The image forming apparatus described in Patent Literature 1 can for example form the same image on a plurality of sheets in accordance with registered print settings.

CITATION LIST

Patent Literature

[Patent Literature 1]
Japanese Patent Application Laid-Open Publication No. 2012-18695

SUMMARY OF INVENTION

Technical Problem

However, it is not easy to form different images on a plurality of sheets and output the plurality of sheets in accordance with a seating order using the image forming apparatus described in Patent Literature 1.

The present invention was achieved in consideration of the above problem and an object thereof is to provide an image forming apparatus that allows setting of an output order so that a plurality of sheets are easily distributed to a plurality of seats, respectively.

Solution to Problem

An image forming apparatus according to an aspect of the present invention includes a display, a detector, a determination section, a processing section, and an image forming section. The display displays an image exhibiting a seating chart including a plurality of seat images. The detector detects a first movement trace of a detection target on the display. The determination section determines an order of the plurality of seat images based on the first movement trace. The processing section processes an original document image to generate a plurality of output images respectively corresponding to the plurality of seat images. The image forming section forms the plurality of output images on a plurality of sheets, respectively, in accordance with the order determined by the determination section. At least two output images of the plurality of output images are at least partially different from each other.

Advantageous Effects of Invention

The present invention allows setting of an output order that facilitates distribution of a plurality of sheets to a plurality of seats, respectively.

DESCRIPTION OF EMBODIMENTS

Figure 1:
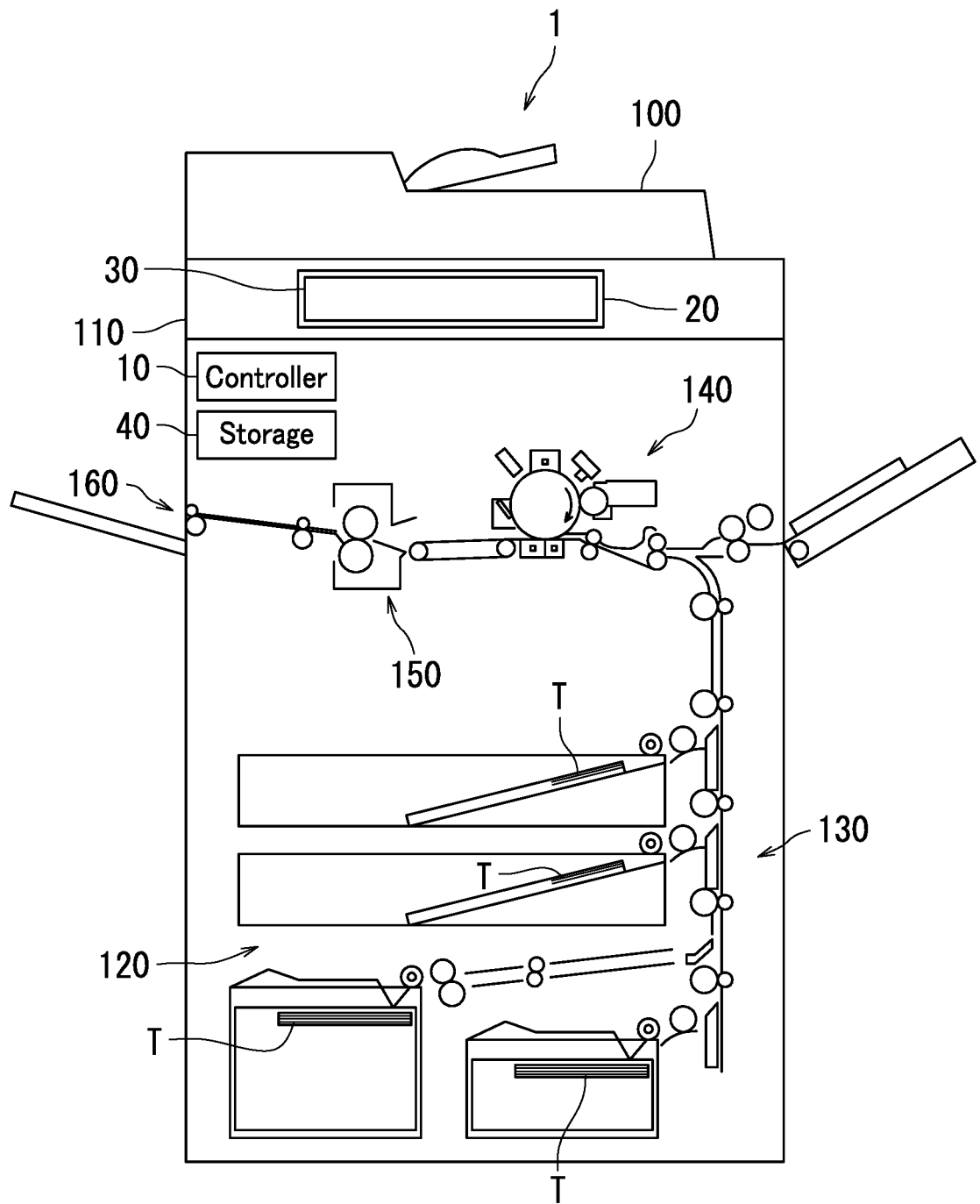
FIG. 1 is a diagram illustrating an image forming apparatus according to a first embodiment of the present invention.

The following describes embodiments of the present invention with reference to FIGS. 1 to 19. Note that elements in the drawings that are the same or equivalent are marked by the same reference signs and description thereof is not repeated.

First Embodiment

The following describes a general configuration of an image forming apparatus according to a first embodiment of the present invention with reference to FIG. 1. FIG. 1 illustrates an image forming apparatus 1 according to the first embodiment of the present invention. The image forming apparatus 1 is for example a multifunction peripheral having a scan function, a copy function, a printing function, and a facsimile function.

As illustrated in FIG. 1, the image forming apparatus 1 includes a controller 10, a display 20, a detector 30, storage 40, a document feeder 100, an image reading section 110, a housing section 120, a conveyance section 130, an image forming section 140, a fixing section 150, and an ejection section 160. The controller 10 controls operation of the display 20, the detector 30, the storage 40, the document feeder 100, the image reading section 110, the housing section 120, the conveyance section 130, the image forming section 140, the fixing section 150, and the ejection section 160.

The controller 10 is for example a processor. The processor for example includes a central processing unit.

The display 20 is for example a liquid-crystal display. The display 20 displays an image exhibiting a seating chart (referred to below as a seating chart image). The seating chart image includes a plurality of seat images. The plurality of seat images respectively correspond to a plurality of seats arranged in a classroom or an examination room, for example. The detector 30 is for example a touch sensor. According to the present embodiment, the detector 30 is disposed over the display 20 and detects a movement trace, which is a path made by the movement of a detection target on the display 20 (the detector 30). The detector 30 transmits a signal corresponding to the movement trace to the controller 10. The detection target is for example a stylus, a touch pen, or a finger.

The storage 40 is for example memory. The storage 40 includes memory such as random access memory (RAM) and read only memory (ROM). The storage 40 also includes an optical disk (a computer storage medium) such as CD-ROM. The storage 40 may further include magnetic disk storage such as a hard disk drive. The storage 40 stores therein data and computer programs.

The document feeder 100 feeds an original document to the image reading section 110. The image reading section 110 (a reading section) is for example a scanner. The image reading section 110 (the reading section) reads an image from the original document (referred to below as an original document image) and generates image data indicating the original document image. The image data indicating the original document image is transmitted to the controller 10. The housing section 120 houses sheets T, on which images are formed. The conveyance section 130 conveys each sheet T from the housing section 120 to the ejection section 160 by way of the image forming section 140 and the fixing section 150.

The image forming section 140 forms an image on a sheet T. According to the present embodiment, the image forming section 140 forms an image on a sheet T through an electrophotographic process. Note that the image forming section 140 may form an image on a sheet T through an inkjet process. The image forming section 140 for example includes a light exposure device, a charger, a photosensitive drum, and a development device.

The fixing section 150 includes a heat member and a pressure member. The fixing section 150 applies heat and pressure to the sheet T with the image formed thereon to fix the image to the sheet T. The ejection section 160 ejects (outputs) the sheet T.

Figure 2:
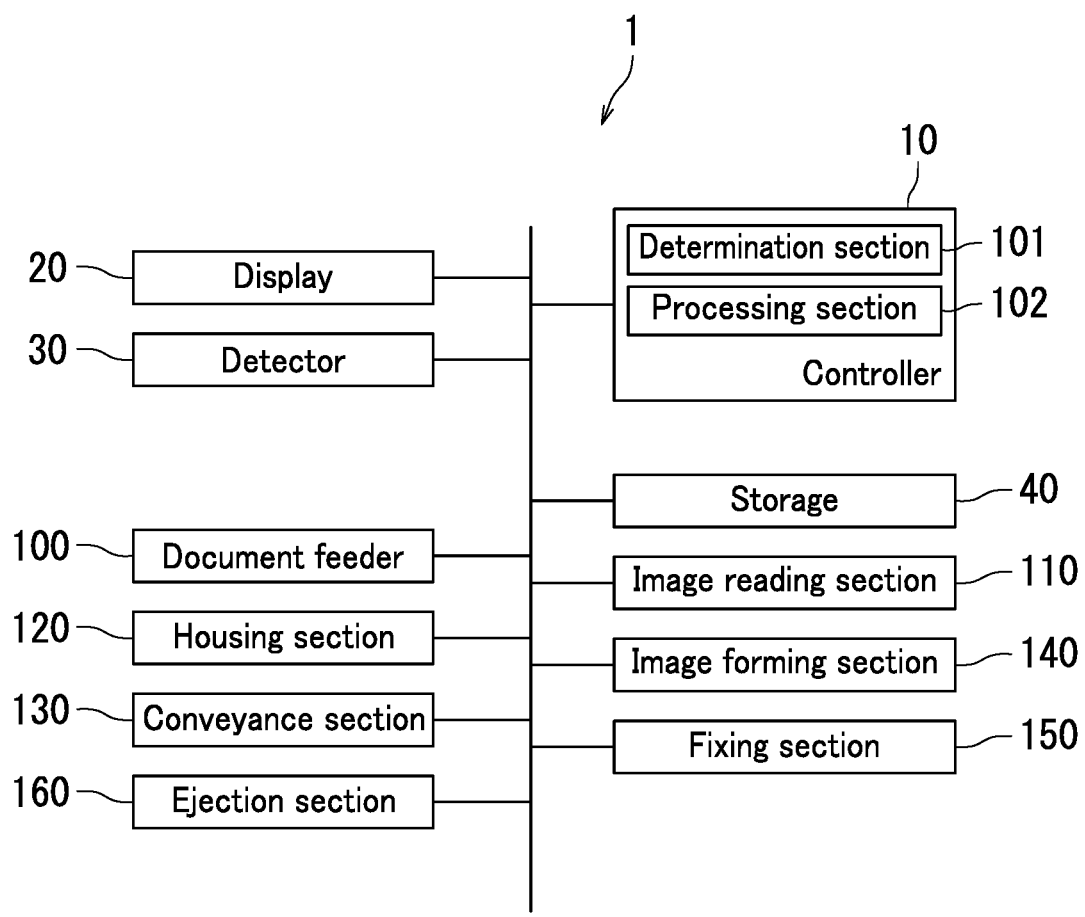
FIG. 2 is a block diagram illustrating a configuration of the image forming apparatus according to the first embodiment of the present invention.

The following describes the controller 10 according to the present embodiment with reference to FIG. 2. FIG. 2 is a block diagram illustrating a configuration of the image forming apparatus 1 according to the first embodiment. As illustrated in FIG. 2, the controller 10 includes a determination section 101 and a processing section 102. The controller 10 functions as the determination section 101 and the processing section 102 by executing a computer program stored in the storage 40.

The determination section 101 determines an order of the seat images based on a first movement trace. The processing section 102 generates output images (image data of the output images). Specifically, the processing section 102 performs a process (image processing) on the original document image (image data of the original document image) so as to generate a plurality of output images respectively corresponding to the plurality of seat images. The original document image may for example be an image created by a user using application software such as word-processing software.

The output images mean images to be formed on sheets T by the image forming section 140. Typically, the output images include images obtained by deleting a portion of the original document image, images obtained by altering a color of at least a portion of the original document image, images obtained by scaling at least a portion of the original document image, or images obtained by adding another image to the original document image. In a situation in which the original document image exhibits a sentence, the output images include images exhibiting a translation of the sentence exhibited by the original document image.

According to the present embodiment, the image forming section 140 forms the plurality of output images on a plurality of sheets T, respectively. The plurality of output images are formed on the plurality of sheets T in accordance with the order determined by the determination section 101. At least two output images of the plurality of output images are at least partially different from each other.

As described above with reference to FIGS. 1 and 2, the image forming apparatus 1 according to the first embodiment determines the order of the plurality of sheet images based on the first movement trace upon detecting the first movement trace of the detection target on the display 20 (the detector 30). The processing section 102 generates the plurality of output images respectively corresponding to the plurality of seat images by performing a process on the original document image. The image forming section 140 forms the plurality of output images on the plurality of sheets T, respectively, in accordance with the determined order. In other words, the plurality of sheets T are ejected (output) by the ejection section 160 in accordance with the determined order. At least two output images of the plurality of output images are at least partially different from each other. The plurality of seat images respectively correspond to the plurality of seats. The image forming apparatus 1 according to the present embodiment can therefore form different images for the respective seats on a plurality of sheets, and then output the plurality of sheets in accordance with an order in which the seats are arranged. As a result, it is easy to distribute the plurality of sheets T to the respective seats.

Figure 3:
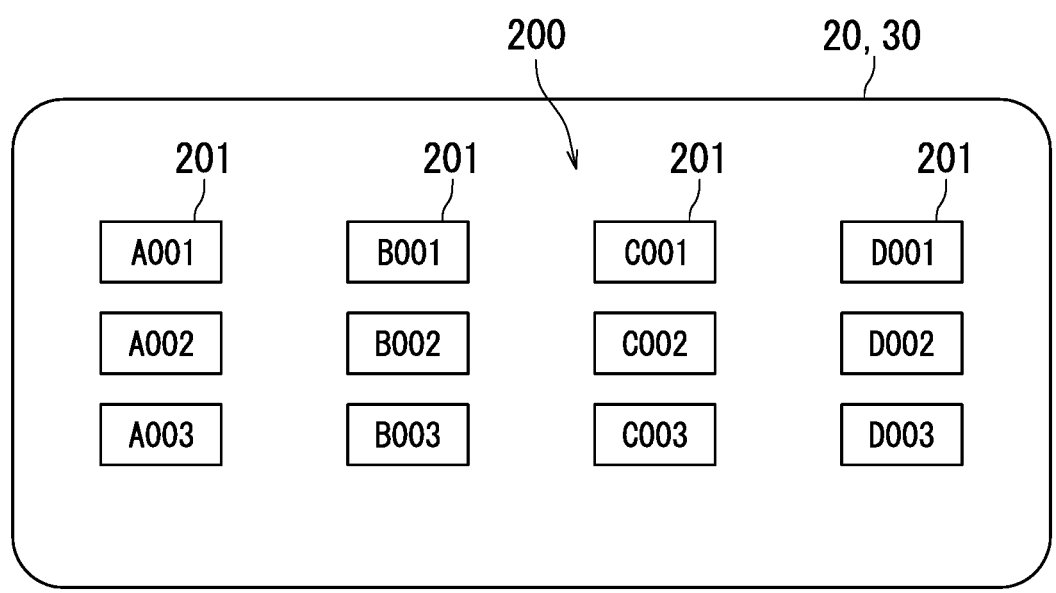
FIG. 3 is a diagram illustrating an example of a seating chart image displayed on a display according to the first embodiment of the present invention.

The following describes a seating chart image 200 according to the present embodiment with reference to FIG. 3. FIG. 3 is a diagram illustrating an example of the seating chart image 200 displayed on the display 20 according to the first embodiment. Note that identification information of individuals corresponding to the respective seat images is shown in the example illustrated in FIG. 3 in order to facilitate understanding.

The display 20 displays the seating chart image 200 as illustrated in FIG. 3. The seating chart image 200 includes a plurality of seat images 201. The arrangement of the plurality of seat images 201 corresponds to the arrangement of a plurality of seats in a classroom or an examination room. Each seat image 201 is associated with identification information of an individual who sits in a seat corresponding to the seat image 201. The storage 40 stores therein a table associating the plurality of seat images 201 with the identification information of the individuals. The identification information of the individuals for example includes either or both of names and examinee numbers of the individuals.

According to the present embodiment, the seating chart image 200 is input into the controller 10 using a seating chart image template including a plurality of seat images 201. The seating chart template is stored in the storage 40. A user edits the seating chart template based on the actual seat arrangement. The user can edit the seating chart template by operating an operation section of the image forming apparatus 1. The seating chart image 200 is created by editing the seating chart template and is input into the controller 10.

Figure 4:
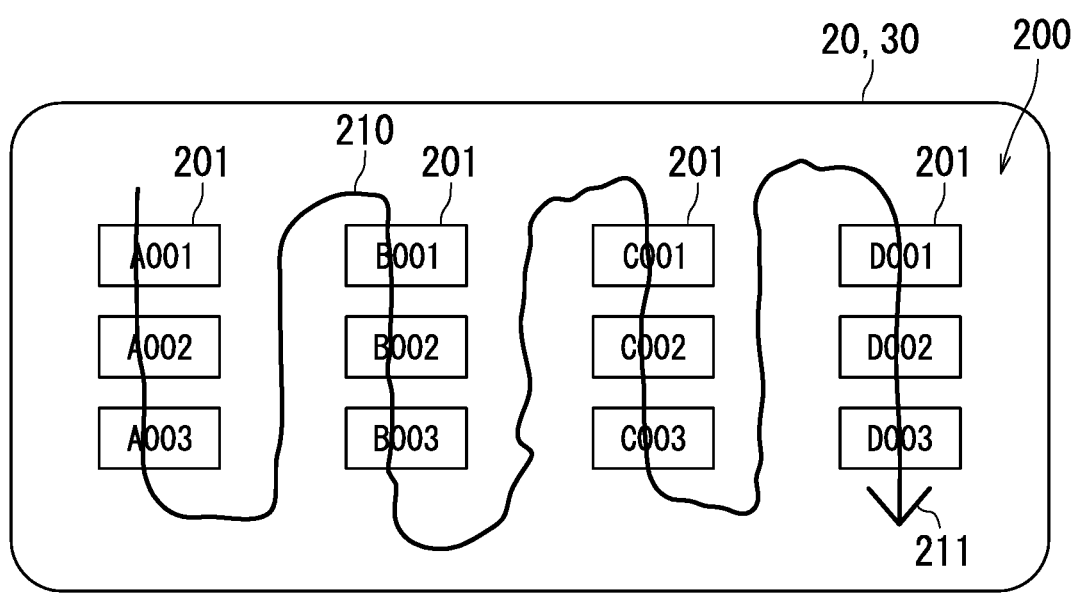
FIG. 4 is a diagram illustrating a first movement trace drawn on the seating chart image illustrated in FIG. 3.
Figure 5:
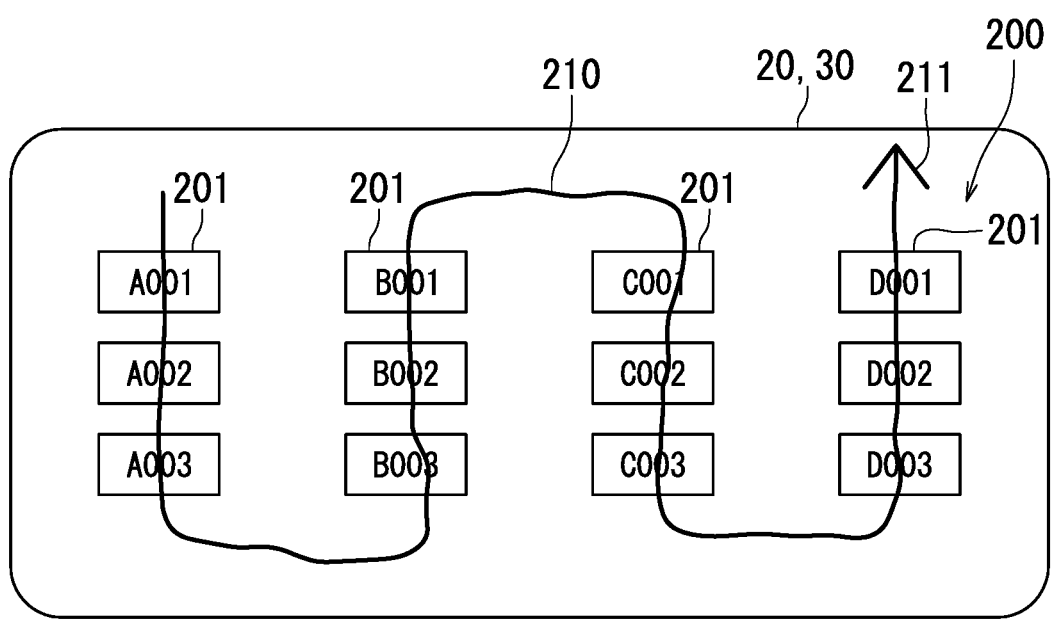
FIG. 5 is a diagram illustrating a different first movement trace drawn on the seating chart image illustrated in FIG. 3.

The following describes a first movement trace 210 according to the present embodiment with reference to FIGS. 4 and 5. FIG. 4 is a diagram illustrating the first movement trace 210 drawn on the seating chart image 200 illustrated in FIG. 3. FIG. 5 is a diagram illustrating a different first movement trace 210 drawn on the seating chart image 200 illustrated in FIG. 3.

As illustrated in FIGS. 4 and 5, each first movement trace 210 includes an arrowhead 211. The arrowhead 211 indicates an end of the first movement trace 210. The first movement trace 210 means a movement trace of the detection target that has moved to pass through the plurality of seat images 201. Specifically, the first movement trace 210 means a movement trace of the detection target such as a stylus that has moved while touching the plurality of seat images 201 displayed on a display surface of the display 20 (the detector 30). The detector 30 transmits a signal corresponding to the movement trace, and in response the controller 10 directs the display 20 to display the first movement trace 210. The user moves the stylus such that the stylus passes through the seat images 201 in a desired order. The desired order for example is an order convenient for the user to distribute the plurality of sheets T to the respective seats.

The following describes a method by which the determination section 101 according to the present embodiment determines the order of the seat images 201 with reference to FIGS. 2, 4, and 5. In the examples illustrated in FIGS. 4 and 5, the determination section 101 determines the order of the seat images 201 based on the order of the passage of the stylus through the seat images 201.

In the example illustrated in FIG. 4, the determination section 101 determines a position of the uppermost (top) seat image 201, which in other words is the seat with the identification number "A001", in a leftmost row as the "first" in the order, a position of the second seat image 201 (the seat with the identification number "A002") from the top of the leftmost row as the "second" in the order, and a position of the third seat image 201 (the seat with the identification number "A003") from the top of the leftmost row as the "third" in the order in the seating chart image 200. Next, as in the case of the leftmost row, the determination section 101 determines a position of the uppermost seat image 201 (the seat with the identification number "B001") in a second left row as the "fourth" in the order, a position of the second seat image 201 (the seat with the identification number "B002") from the top of the second left row as the "fifth" in the order, and a position of the third seat image 201 (the seat with the identification number "B003") from the top of the second left row as the "sixth" in the order. Next, as in the cases of the leftmost row and the second left row, the determination section 101 determines a position of the uppermost seat image 201 (the seat with the identification number "C001") in a third left row as the "seventh" in the order, a position of the second seat image 201 (the seat with the identification number "C002") from the top of the third left row as the "eighth" in the order, and a position of the third seat image 201 (the seat with the identification number "C003") from the top of the third left row as the "ninth" in the order. Lastly, as in the cases of the leftmost row, the second left row, and the third left row, the determination section 101 determines a position of the uppermost seat image 201 (the seat with the identification number "D001") in a rightmost row as the "tenth" in the order, a position of the second seat image 201 (the seat with the identification number "D002") from the top of the rightmost row as the "eleventh" in the order, and a position of the third seat image 201 (the seat with the identification number "D0003") from the top of the rightmost row as the "twelfth" in the order.

In the example illustrated in FIG. 5, the determination section 101 determines a position of the uppermost (top) seat image 201 (the seat with the identification number "A001") in a leftmost row as the "first" in the order, a position of the second seat image 201 (the seat with the identification number "A002") from the top of the leftmost row as the "second" in the order, and a position of the third seat image 201 (the seat with the identification number "A003") from the top of the leftmost row as the "third" in the order in the seating chart image 200. Next, the determination section 101 determines a position of the lowermost (bottom) seat image 201 (the seat with the identification number "B003") in a second left row as the "fourth" in the order, a position of the second seat image 201 (the seat with the identification number "B002") from the top of the second left row as the "fifth" in the order, and a position of the top seat image 201 (the seat with the identification number "B001") in the second left row as the "sixth" in the order. Next, as in the case of the leftmost row, the determination section 101 determines a position of the uppermost seat image 201 (the seat with the identification number "C001") in a third left row as the "seventh" in the order, a position of the second seat image 201 (the seat with the identification number "C002") from the top of the third left row as the "eighth" in the order, and a position of the third seat image 201 (the seat with the identification number "C003") from the top of the third left row as the "ninth" in the order. Lastly, as in the case of the second left row, the determination section 101 determines a position of the lowermost seat image 201 (the seat with the identification number "D003") in a rightmost row as the "tenth" in the order, a position of the second seat image 201 (the seat with the identification number "D002") from the top of the rightmost row as the "eleventh" in the order, and a position of the uppermost seat image 201 (the seat with the identification number "D001") in the rightmost row as the "twelfth" in the order.

As described above with reference to FIGS. 3 to 5, the image forming apparatus 1 according to the present embodiment determines the order of the seat images 201 based on the first movement trace 210. The first movement trace 210 means a movement trace of the detection target that has moved to pass through the seat images 201. Thus, the user can determine the order in which the image forming section 140 forms the images on the plurality of sheets T only by moving the stylus so as to sequentially address the seat images 201 on the display 20 (the detector 30). That is, the user can determine the order in which the image forming section 140 forms the images on the plurality of sheets T through an intuitively perceivable operation. Thus, the image forming apparatus 1 according to the present embodiment facilitates setting of the output order of the plurality of sheets T by the user.

Figure 6:
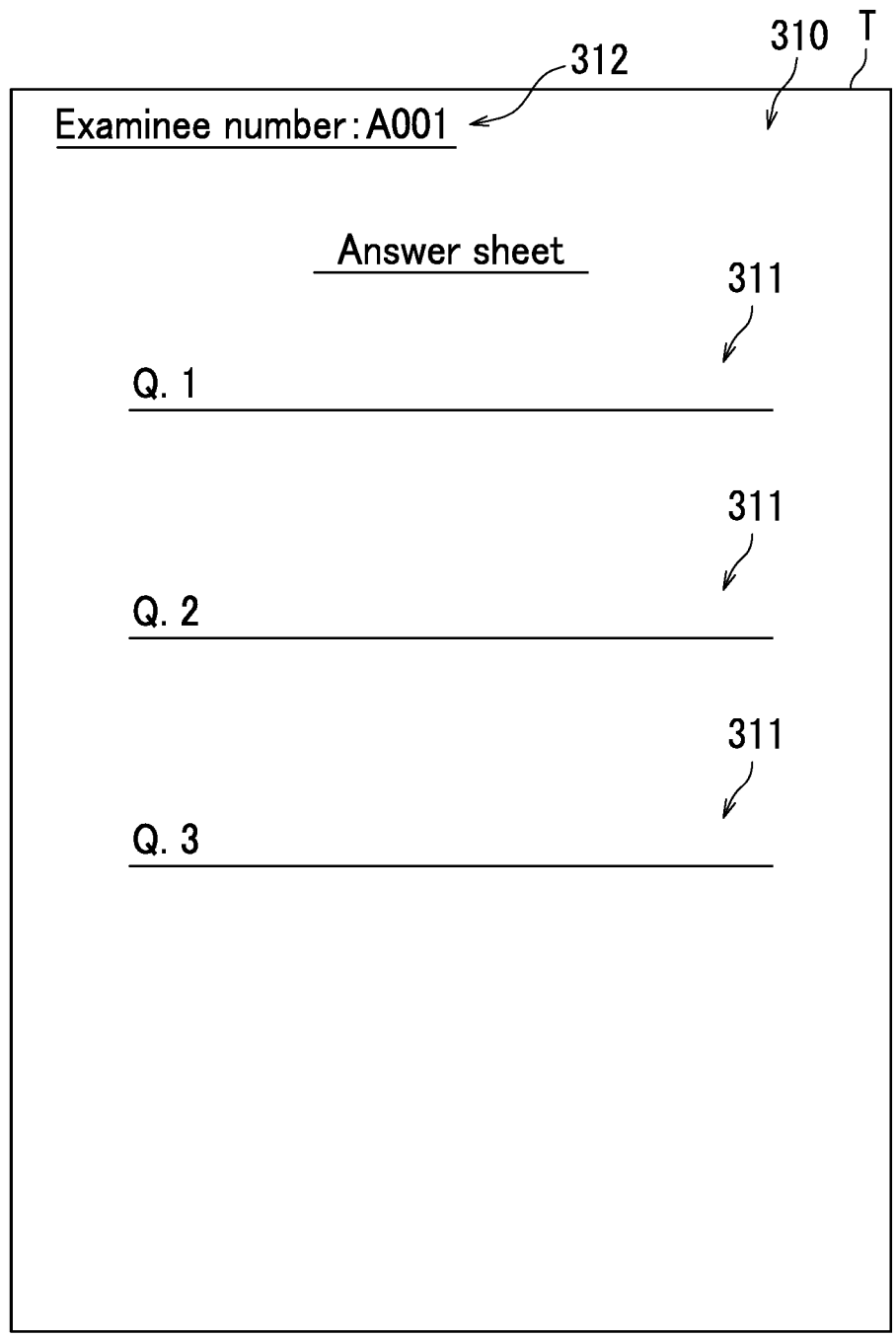
FIG. 6 is a diagram illustrating an example of an object output by the image forming apparatus according to the first embodiment of the present invention.
Figure 7:
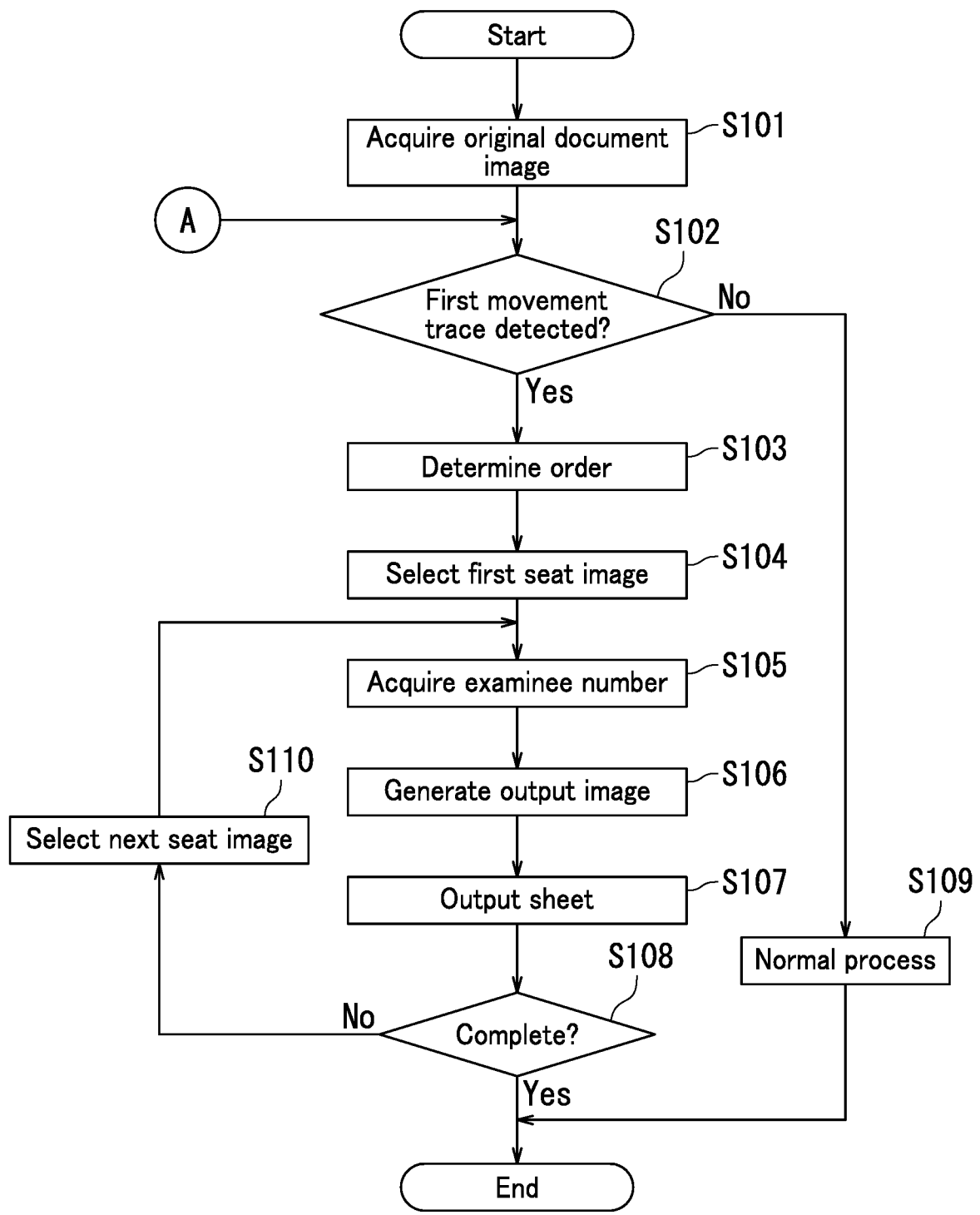
FIG. 7 is a flowchart of an output process according to the first embodiment of the present invention.

The following describes an output process to be performed by the controller 10 according to the present embodiment with reference to FIGS. 6 and 7. FIG. 6 is a diagram illustrating an example of an object (a sheet T) output by the image forming apparatus 1 according to the first embodiment.

An output image 310 according to the present embodiment exhibits one of answer sheets to be distributed to a plurality of seats in a classroom or an examination room. As illustrated in FIG. 6, the output image 310 is formed on the sheet T. The output image 310 includes a plurality of answer fields 311 and an examinee number field 312. An image (an image "A001") exhibiting an examinee number serving as identification information of an individual is formed in the examinee number field 312. Once the image data indicating the original document image has been input, the processing section 102 reads data indicating examinee numbers from the storage 40 and performs a process. Specifically, once the image data (the original document image) indicating the original document image has been received, the processing section 102 performs a process on the original document image to generate image data indicating a plurality of output images 310 that respectively include images each exhibiting a different examinee number among the read examinee numbers. According to the present embodiment, the original document image is the same as the output image 310 except for not including the image "A001" formed in the examinee number field 312.

As described above with reference to FIG. 6, the image forming apparatus 1 according to the present embodiment processes the original document image so that each output image 310 includes identification information (for example, an examinee number). According to the present embodiment, the user can determine the output order of the plurality of sheets T. The output objects each having identification information printed thereon are distributed to the individuals corresponding to (sitting in) the respective seats by distributing the plurality of sheets T to the respective seats in accordance with the determined order. Thus, the present embodiment can prevent the individuals sitting in the respective seats from writing the wrong identification information on the objects output by the image forming apparatus 1. Specifically, the present embodiment can prevent examinees sitting in the respective seats from writing the wrong examinee numbers on the answer sheets.

The following describes the output process according to the first embodiment in detail with reference to FIG. 7. FIG. 7 is a flowchart of the output process according to the first embodiment.

In Step S101 in FIG. 7, the controller 10 directs the image reading section 110 to read an original document image from an original document. The processing section 102 acquires the original document image (image data of the original document image) through the image reading section 110 reading the original document image from the original document.

In Step S102, the controller 10 determines whether or not the detector 30 has detected a first movement trace 210 of a stylus on the display 20 (the detector 30). Specifically, the controller 10 determines whether or not there is a movement trace resulting from sequential passage of the stylus through the plurality of seat images 201 based on a signal transmitted from the detector 30. Upon the controller 10 determining that the detector 30 has not detected any first movement trace 210 (No in Step S102), the process advances to Step S109. In Step S109, a normal image forming process is performed. Upon the controller 10 determining that the detector 30 has detected the first movement trace 210 (Yes in Step S102), the process advances to Step S103.

In Step S103, the determination section 101 determines an order of the seat images 201 based on the first movement trace 210.

In Step S104, the controller 10 selects the "first" seat image 201 in the order.

In Step S105, the processing section 102 acquires information indicating an examinee number from the storage 40 as identification information of an individual associated with the selected seat image 201.

In Step S106, the processing section 102 generates an output image (image data of the output image) corresponding to the selected seat image 201 by performing a process on the original document image (image data indicating the original document image). Specifically, the processing section 102 performs a process on the original document image (image data indicating the original document image) so that the examinee number corresponding to the selected seat image 201 is included in the output image.

In Step S107, the image forming section 140 forms the output image on a sheet T based on the image data of the output image created with respect to the selected seat image 201. As a result, the sheet T is output.

In Step S108, the controller 10 determines whether or not the image forming section 140 has formed, on sheets T, all of output images corresponding to the seat images 201 for which the determination section 101 has determined the order. Upon the controller 10 determining that the image forming section 140 has formed all of the output images corresponding to the seat images 201 on the sheets T (Yes in Step S108), the process comes to an end. Upon the controller 10 determining that the image forming section 140 has not formed all of the output images corresponding to the seat images 201 on the sheets T (No in Step S108), the process advances to Step S110.

In Step S110, the controller 10 selects the next seat image 201 in the order, and the process returns to Step S105.

As described above with reference to FIGS. 1 to 7, the image forming apparatus 1 according to the present embodiment creates and outputs answer sheets respectively including examinee numbers corresponding to examinees who sit in the respective seats in accordance with the order determined based on the first movement trace 210. The user can therefore easily distribute the answer sheets including the examinee numbers to the examinees sitting in the respective seats.

According to the first embodiment, the seating chart image 200 is created by editing the seating chart template and is input into the controller 10. However, the present invention is not limited as such. For example, the seating chart image 200 may be input into the controller 10 through the image reading section 110 reading an original image having the seating chart image 200 formed thereon. The seating chart image 200 to be read by the image reading section 110 may be handwritten by the user.

As described above, the image forming apparatus 1 according to the present embodiment can read the seating chart image 200 from a sheet T and input the read image into the controller 10. It is therefore possible to easily input the seating chart image 200 created by the user into the controller 10.

Second Embodiment

The following describes a second embodiment of the present invention with reference to FIGS. 7 and 8 to 11. In the output process according to the first embodiment, the controller 10 creates a different output image for each individual. In an output process according to the second embodiment, the controller 10 sets one or more groups for the plurality of seat images 201, and creates a different output image for each group. The following describes differences between the second embodiment and the first embodiment.

Figure 8:
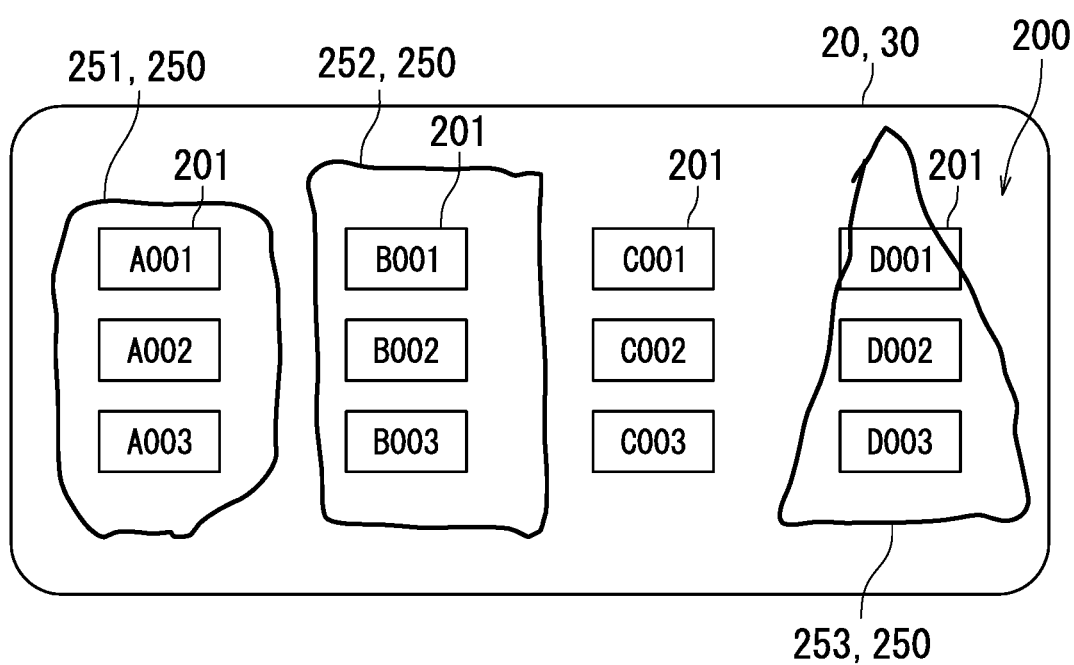
FIG. 8 is a diagram illustrating an example of second movement traces according to a second embodiment of the present invention.

First, second movement traces 250 according to the second embodiment will be described with reference to FIG. 8. FIG. 8 is a diagram illustrating an example of the second movement traces 250 according to the second embodiment. Specifically, FIG. 8 is a diagram illustrating the second movement traces 250 drawn on the seating chart image 200 illustrated in FIG. 3.

The detector 30 according to the present embodiment further detects the second movement traces 250. The second movement traces 250 each mean a movement trace of a stylus that has moved to enclose two or more of the plurality of seat images 201. The detector 30 transmits signals indicating the movement traces of the stylus to the controller 10.

As illustrated in FIG. 8, the display 20 displays the second movement traces 250 indicating different shapes with the seating chart image 200 including the plurality of seat images 201 in response to the user moving the stylus to enclose some of the plurality of seat images 201 on the display 20 (the detector 30). According to the present embodiment, the second movement traces 250 include a second movement trace 251, a second movement trace 252, and a second movement trace 253. The second movement trace 251 is substantially elliptical, the second movement trace 252 is substantially rectangular, and the second movement trace 253 is substantially triangular. The controller 10 specifies types of the shapes indicated by the second movement traces 250 by pattern matching.

The processing section 102 determines that a seat image 201 is enclosed by a movement trace (a second movement trace 250) of the stylus on condition that at least a portion of the seat image 201 is within the movement trace of the stylus. In other words, the processing section 102 specifies seat images 201 that are each at least partially enclosed by any of the second movement traces 250 among the plurality of seat images 201.

The processing section 102 according to the present embodiment performs first processes (processes associated with the types of the shapes indicated by the second movement traces 250) on the original document image (image data of the original document image) with respect to the seat images 201 enclosed by the second movement traces 250 among the plurality of seat images 201 to generate output images (image data of the output images). The storage 40 stores therein a table associating data indicating first processes (first process information) with data indicating types of shapes that are indicated by second movement traces 250. Once the types of the shapes indicated by the second movement traces 250 have been specified, the processing section 102 reads from the storage 40 the first process information associated with the types of the shapes indicated by the second movement traces 250. The processing section 102 performs the first processes indicated by the first process information read from the storage 40 on the original document image (original image data) to create the output images (output image data).

As described above with reference to FIG. 8, once some of the plurality of seat images 201 have been enclosed by the second movement traces 250, the image forming apparatus 1 according to the present embodiment specifies the enclosed seat images 201 among the plurality of seat images 201. The image forming apparatus 1 can perform the first processes with respect to the specified seat images 201 (associated with the types of the shapes indicated by the second movement traces 250 enclosing the specified seat images 201) on the original document image (image data of the original document image) to generate the output images (image data indicating the output images). It is therefore possible to generate various output images from the original document image and output a plurality of sheets T having the various output images formed thereon.

The following describes a process of forming the various output images on the plurality of sheets T in detail with reference to FIG. 8.

The user draws the first movement trace 210 illustrated in FIG. 4 on the display 20 (the detector 30) while the second movement trace 251, the second movement trace 252, and the second movement trace 253 are being displayed on the display 20 as illustrated in FIG. 8. Once the first movement trace 210 has been drawn, the determination section 101 determines the order of the plurality of seat images 201 based on the first movement trace 210. The image forming section 140 forms a plurality of output images including different output images on a plurality of sheets in accordance with the determined order. As a result, the plurality of sheets are output in accordance with the determined order.

As described above with reference to FIG. 8, the image forming apparatus 1 according to the present embodiment allows setting of an output order that facilitates distribution of a plurality of sheets T having various output images formed thereon to a plurality of seats, respectively.

Figure 9:
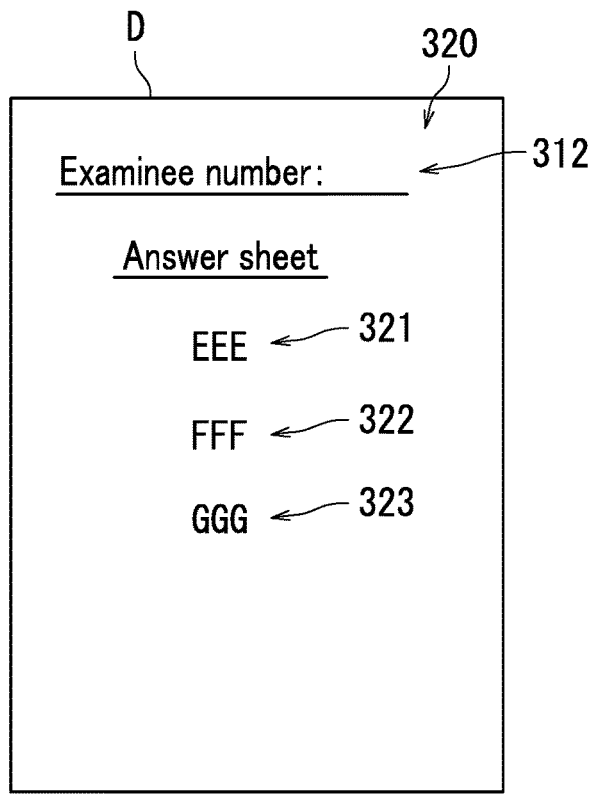
FIG. 9 is a diagram illustrating an example of an original document according to the second embodiment of the present invention.
Figure 10:
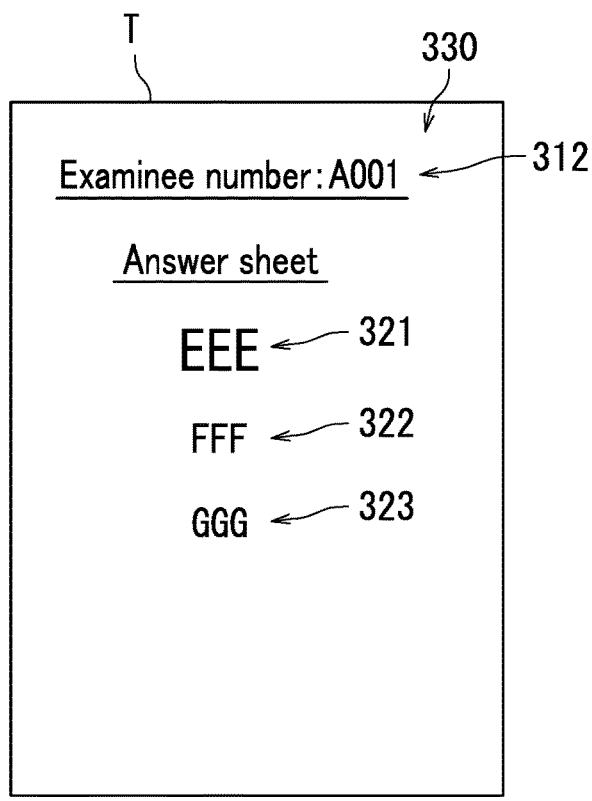
FIG. 10 is a diagram illustrating an example of an object output by the image forming apparatus according to the second embodiment of the present invention.
Figure 11:
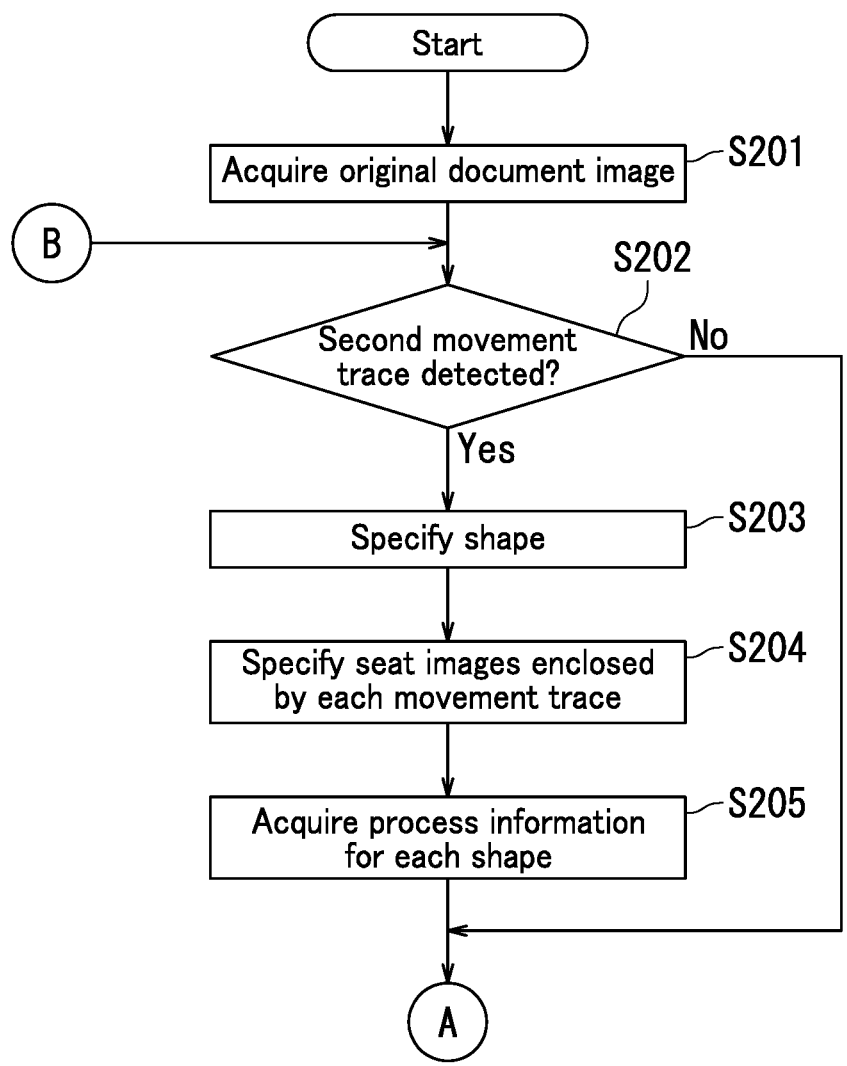
FIG. 11 is a flowchart of an output process according to the second embodiment of the present invention.

The following describes the output process according to the second embodiment with reference to FIGS. 7 and 9 to 11. FIG. 9 illustrates an example of an original document D according to the second embodiment. FIG. 10 illustrates an example of an object (a sheet T) output by the image forming apparatus 1 according to the second embodiment. FIG. 11 is a flowchart of the output process according to the second embodiment.

As illustrated in FIG. 9, the original document D is an answer sheet and has an original document image 320. The original document image 320 includes a first character string 321, a second character string 322, a third character string 323, and an examinee number field 312.

As illustrated in FIG. 10, an output image 330 is formed on the sheet T. The output image 330 includes the first character string 321, the second character string 322, and the third character string 323. The output image 330 also includes the examinee number field 312. The output image 330 illustrated in FIG. 10 is different from the original document image 320 illustrated in FIG. 9 in that the first character string 321 is highlighted in the output image 330. Specifically, the first character string 321 included in the output image 330 is formed on the sheet T as an image exhibiting the character string in boldface.

The following describes the output process according to the second embodiment with reference to FIGS. 7 and 11. In Step S201 in FIG. 11, the controller 10 directs the image reading section 110 to read an image from the original document D illustrated in FIG. 9. The processing section 102 acquires the original document image 320 (image data of the original document image) through the image reading section 110 reading the original document image from the original document D.

In Step S202, the controller 10 determines whether or not the detector 30 has detected a second movement trace 250 on the display 20 (the detector 30). Specifically, the controller 10 determines whether or not there is a movement trace of the stylus enclosing two or more of the plurality of seat images 201 based on a signal transmitted from the detector 30. Upon the controller 10 determining that the detector 30 has not detected any second movement trace 250 (No in Step S202), the process advances to Step S102 in FIG. 7. Upon the controller 10 determining that the detector 30 has detected at least one second movement trace 250 in Step S202 in FIG. 11 (Yes in Step S202), the process advances to Step S203.

In Step S203, the processing section 102 specifies the type of the shape indicated by the second movement trace 250 by pattern matching. In the example illustrated in FIG. 8, the processing section 102 specifies the type of the shape indicated by the second movement trace 251 as an ellipse, the type of the shape indicated by the second movement trace 252 as a rectangle, and the type of the shape indicated by the second movement trace 253 as a triangle among the second movement traces 250.

In Step S204, the processing section 102 specifies seat images 201 enclosed by the second movement trace 250. In the example illustrated in FIG. 8, the processing section 102 specifies the three seat images 201 (the seats with the identification numbers "A001", "A002", and "A003") in the leftmost row illustrated in FIG. 8 as seat images 201 enclosed by the second movement trace 251. Likewise, the processing section 102 specifies the three seat images 201 (the seats with the identification numbers "B001", "B002", and "B003") in the second left row illustrated in FIG. 8 as seat images 201 enclosed by the second movement trace 252. Likewise, the processing section 102 specifies the three seat images 201 (the seats with the identification numbers "D001", "D002", and "D003") in the rightmost row illustrated in FIG. 8 as seat images 201 enclosed by the second movement trace 253.

Once the processing section 102 has acquired the first process information from the storage 40 based on the type of the shape indicated by the second movement trace 250 in Step S205, the process advances to Step S102 in FIG. 7. Specifically, in Step S205 in FIG. 11, the processing section 102 reads from the storage 40 the first process information corresponding to the second movement trace 251, the first process information corresponding to the second movement trace 252, and the first process information corresponding to the second movement trace 253 among the second movement traces 250. For example, the first process information corresponding to the second movement trace 251 indicates a process of highlighting the first character string 321 (the character string "EEE") of the original document image 320 illustrated in FIG. 9. The first process corresponding to the second movement trace 252 indicates a process of highlighting the second character string 322 (the character string "FFF") of the original document image 320. The first process corresponding to the second movement trace 253 indicates a process of highlighting the third character string 323 (the character string "GGG") of the original document image 320.

The following describes a process to be performed by the controller 10 after determination that the detector 30 has not detected any second movement trace 250 (No in Step S202) or after acquisition of the first process information (Step S205). That is, the following describes a process to be performed through Step S102 and the subsequent steps in FIG. 7. In the process to be performed through Step S102 and the subsequent steps, what is performed in Step S106 differs between the second embodiment and the first embodiment. The following mainly describes the difference between the second embodiment and the first embodiment.

In Step S106 in FIG. 7, the processing section 102 generates an output image 330 corresponding to the selected seat image 201. Specifically, as in the first embodiment (see FIG. 6), the processing section 102 performs a process on the original document image 320 (image data of the original document image 320) so that identification information associated with the selected seat image 201 is included in the output image 330. The process of including the identification information in the output image 330 is not mandatory and can be canceled through system settings in the second embodiment. In a situation in which there is a second movement trace 250 that includes the selected seat image 201, the processing section 102 performs the first process associated with the shape indicated by the second movement trace 250 on the original document image 320 (image data of the original document image 320). For example, the processing section 102 processes the original document image 320 so as to highlight the character string "EEE" described with reference to FIG. 9 in a situation in which the selected seat image 201 is enclosed by the second movement trace 251. The processing section 102 processes the original document image 320 so as to highlight the second character string "FFF" of the original document image 320 described with reference to FIG. 9 in a situation in which the selected seat image 201 is enclosed by the second movement trace 252. The processing section 102 processes the original document image 320 so as to highlight the third character string "GGG" of the original document image 320 described with reference to FIG. 9 in a situation in which the selected seat image 201 is enclosed by the second movement trace 253.

As described above with reference to FIGS. 7 and 8 to 11, the image forming apparatus 1 according to the present embodiment can perform processes (the first processes) associated with the types of the shapes indicated by the second movement traces 250 on the original document image 320 to generate output images 330. It is therefore possible to easily distribute the plurality of sheets T having various output images 330 formed thereon to the plurality of seats, respectively.

Third Embodiment

Figure 12:
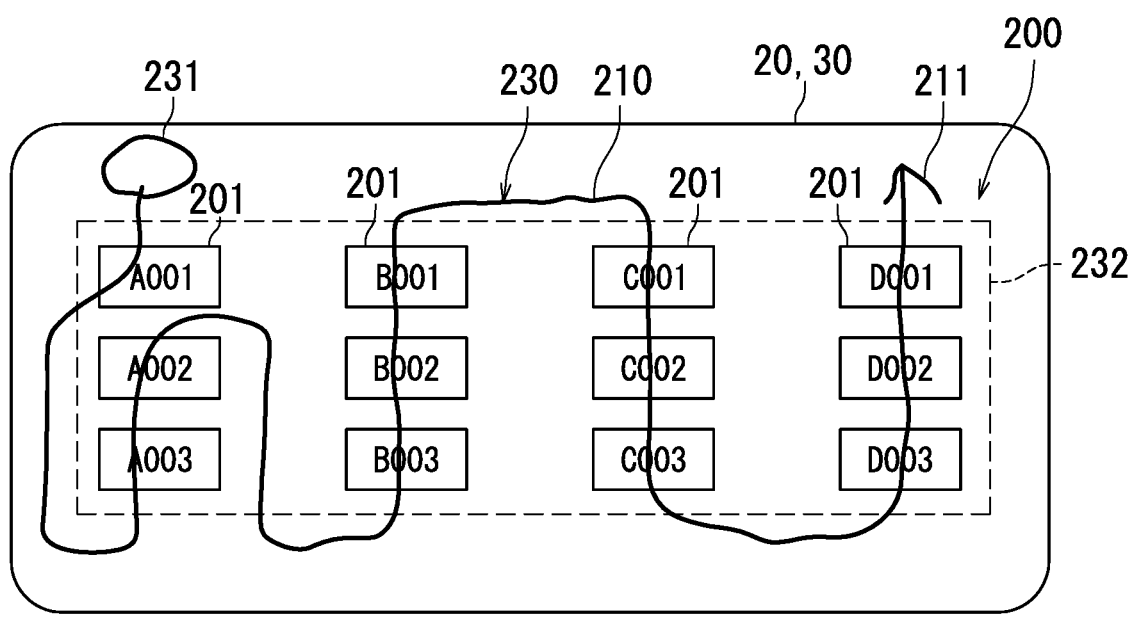
FIG. 12 is a diagram illustrating an example of a composite trace according to a third embodiment of the present invention.

The following describes a third embodiment of the present invention with reference to FIGS. 7, 11, and 12 to 14. FIG. 12 is a diagram illustrating an example of a composite trace 230 according to the third embodiment. Specifically, FIG. 12 is a diagram illustrating the composite trace 230 drawn on the seating chart image 200 illustrated in FIG. 3. According to the present embodiment, the composite trace 230 includes a third movement trace 231 and a first movement trace 210.

According to the first embodiment, the controller 10 generates output images (image data indicating the output images) based on the first movement trace 210. According to the second embodiment, the controller 10 generates output images (image data indicating the output images) based on the second movement traces 250. According to the third embodiment, the controller 10 generates output images (image data indicating the output images) based on the third movement trace 231. The following describes differences between the third embodiment and the first and second embodiments.

The detector 30 according to the third embodiment further detects the third movement trace 231 on the display 20 (the detector 30). The detector 30 transmits a signal indicating the detected third movement trace 231 to the controller 10. The third movement trace 231 means a movement trace of a stylus located outside of a seat image region 232 of the display 20. The seat image region 232 means a region of the display 20 in which the plurality of seat images 201 are displayed. According to the present embodiment, the seat image region 232 is a rectangular region including all of the seat images 201.

As illustrated in FIG. 12, the third movement trace 231 connects to the beginning of the first movement trace 210 (i.e., the third movement trace 231 and the first movement trace 210 are drawn as one continuous stroke). The third movement trace 231 illustrated in FIG. 12 has a substantially circular shape. The processing section 102 specifies the type of the shape indicated by the third movement trace 231 by pattern matching. Specifically, the processing section 102 specifies the type of the shape indicated by the third movement trace 231 as a circle by pattern matching.

Upon specifying the type of the shape indicated by the third movement trace 231, the processing section 102 performs a second process. The second process is associated with the type of the shape indicated by the third movement trace 231. The storage 40 stores therein a table associating data indicating second processes (second process information) with data indicating types of shapes that are indicated by third movement traces 231. The processing section 102 reads from the storage 40 the second process information in association with the type of the shape indicated by the third movement trace 231. The processing section 102 performs the second process indicated by the second process information read from the storage 40 on the original document image (image data of the original document image). For example, the second process corresponding to the circular third movement trace 231 is to include a name in each output image as individual identification information.

Figure 13:
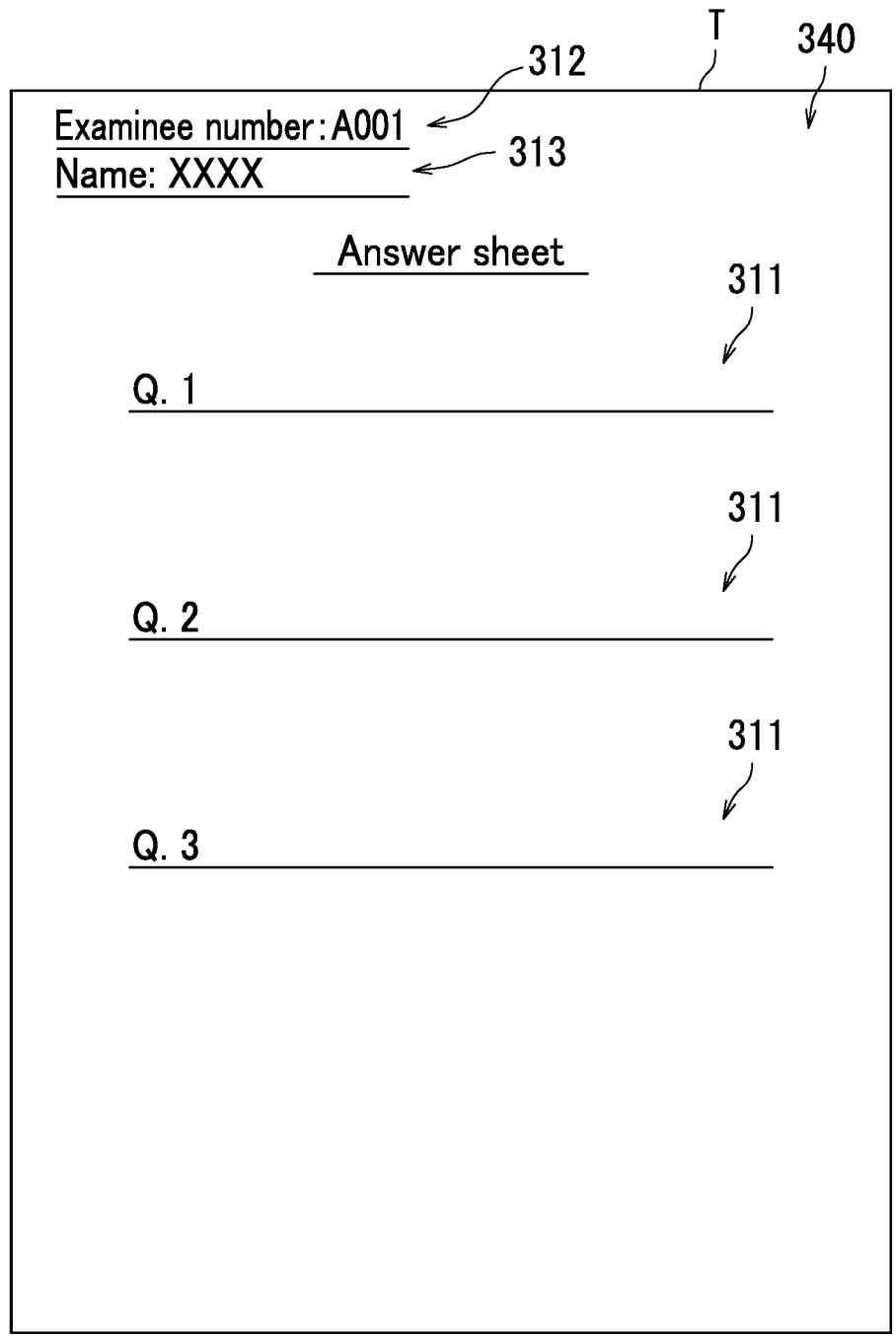
FIG. 13 is a diagram illustrating an example of an object output by an image forming apparatus according to the third embodiment of the present invention.
Figure 14:
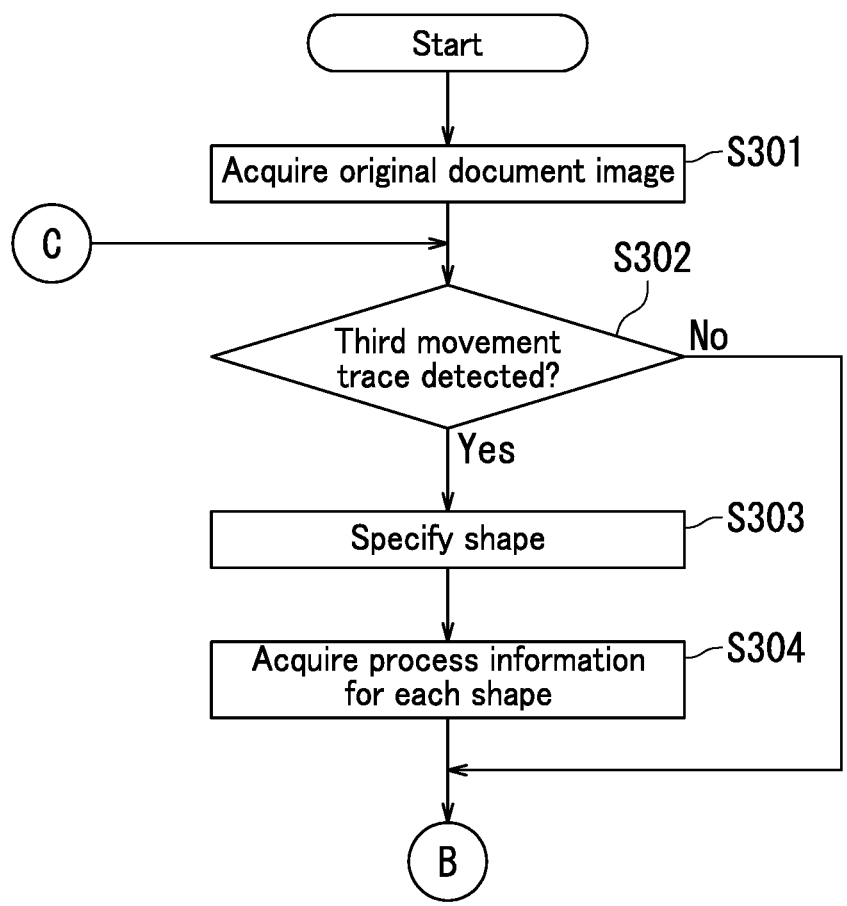
FIG. 14 is a flowchart of an output process according to the third embodiment of the present invention.

The following describes an output process according to the third embodiment with reference to FIGS. 7, 13, and 14. FIG. 13 is a diagram illustrating an example of an object (a sheet T) output by the image forming apparatus 1 according to the third embodiment.

As illustrated in FIG. 13, an output image 340 is formed on the sheet T. The output image 340 exhibits one of answer sheets to be distributed to a plurality of seats in a classroom or an examination room. The output image 340 includes a plurality of answer fields 311, an examinee number field 312, and a name field 313. An image exhibiting an examinee number (the image "A001") is formed in the examinee number field 312. An image exhibiting a name (an image "XXXX") is formed in the name field 313.

The following describes an output process according to the third embodiment in detail with reference to FIGS. 7, 11, and 14. FIG. 14 is a flowchart of the output process according to the third embodiment.

In Step S301 in FIG. 14, the controller 10 directs the image reading section 110 to read an original document image from an original document. The processing section 102 acquires the original document image (original document image data) through the image reading section 110 reading the original document image from the original document. According to the present embodiment, the original document image acquired by the processing section 102 is the same as the output image 340 described with reference to FIG. 13 except for including neither the image exhibiting the examinee number formed in the examinee number field 312 (the image "A001") nor the image exhibiting the name formed in the name field 313 (the image "XXXX").

In Step S302, the controller 10 determines whether or not the detector 30 has detected a third movement trace 231 of a stylus on the display 20 (the detector 30). Specifically, the controller 10 determines whether or not there is a movement trace of the stylus located outside of the seat image region 232 based on a signal transmitted from the detector 30. Upon the controller 10 determining that the detector 30 has not detected any third movement trace 231 (No in Step S302), the process advances to Step S202 in FIG. 11. Upon the controller 10 determining that the detector 30 has detected a third movement trace 231 in Step S302 in FIG. 14 (Yes in Step S302), the process advances to Step S303.

In Step S303, the processing section 102 specifies the type of the shape indicated by the third movement trace 231 by pattern matching. In the example illustrated in FIG. 12, the processing section 102 specifies the type of the shape indicated by the third movement trace 231 as a circle.

In Step S304, the processing section 102 acquires the second process information from the storage 40 based on the type of the shape indicated by the third movement trace 231. Specifically, the processing section 102 acquires the second process information corresponding to the circular third movement trace 231. According to the present embodiment, the second process corresponding to the circular third movement trace 231 is for example a process of forming an image exhibiting a name in the name field 313. Next, the process advances to Step S202 in FIG. 11.

The following describes a process to be performed by the controller 10 after determination that the detector 30 has not detected any third movement trace 231 (No in Step S302) or after acquisition of the second process information (Step S304). That is, the following describes a process to be performed through Step S202 and the subsequent steps in FIG. 11. In the process to be performed through Step S202 and the subsequent steps, what is performed in Step S106 in FIG. 7 differs between the third embodiment and the first and second embodiments. The following mainly describes the difference between the third embodiment and the first and second embodiments.

In Step S106 in FIG. 7, the processing section 102 generates an output image 340 (image data of the output image 340) corresponding to the selected seat image 201. Specifically, as in the first embodiment (see FIG. 6), the processing section 102 performs a process on the original document image (image data of the original document image) so that an image exhibiting an examinee number (the image "A001") is included in the output image 340 (see FIG. 13). The process of including examinee number in the output image 340 is not mandatory and can be canceled through system settings in the third embodiment. Upon the controller 10 determining that the detector 30 has detected the third movement trace 231 (Yes in Step S302), the processing section 102 performs a process on the original document image (image data of the original document image) so that images indicating names (the image "XXXX") are included in output images 340, respectively, as illustrated in FIG. 13.

As described above with reference to FIGS. 7, 11, and 12 to 14, the image forming apparatus 1 according to the present embodiment can perform the third process on the original document image (image data of the original document image) according to the type of the shape indicated by the third movement trace 231. That is, the image forming apparatus 1 according to the present embodiment can perform various processes according to types of shapes indicated by third movement traces 231. As a result, the user can obtain various output images 340 from the original document image and easily distribute a plurality of sheets T having the various output images 340 formed thereon to the plurality of seats, respectively.

The first movement trace 210 illustrated in FIG. 12 is different from the first movement trace 210 illustrated in FIG. 5. According to the first movement trace 210 illustrated in FIG. 12, the determination section 101 determines a position of the lowermost (bottom) seat image 201 (the seat with the identification number "A003") in a leftmost row as the "second" in the order and a position of the second seat image 201 (the seat with the identification number "A002") from the top of the leftmost row as the "third" in the order. Thus, even if some of people who sit in the respective seats (sitters) switch seats, an order that does not conform to the arrangement of the seat images 201 can be set as indicated by the first movement trace 210 illustrated in FIG. 12.

As described above with reference to FIG. 12, the image forming apparatus 1 according to the present embodiment can change the output order of the plurality of sheets T by changing the trace (the order of the passage of the detection target through the seat images 201) that is drawn as the first movement trace 210. In a situation in which the sitters switch seats, therefore, the plurality of sheets T can be output in accordance with a seating order of the sitters who have switched seats.

Note that a modification process of modifying the seating chart image 200 may be set as a process associated with the shape indicated by the third movement trace 231. Specifically, the user may set the modification process of modifying the seating chart image 200 as a process associated with the circular third movement trace 231. In a configuration in which the modification process of modifying the seating chart image 200 is set for the circular third movement trace 231, the processing section 102 changes the arrangement of the plurality of seat images 201 in the seating chart image 200 in accordance with the order that is determined by the determination section 101 in response to the composite trace 230 being drawn on the display 20 (the detector 30) as illustrated in FIG. 12. In the example illustrated in FIG. 12, the processing section 102 switches positions of the second seat image 201 (the seat with the identification number "A001") from the top of the leftmost row and the third seat image 201 (the seat with the identification number "A003") from the top of the leftmost row in the seating chart image 200. Thus, the seating chart image 200 can be easily modified so as to conform to the actual seating order.

According to the third embodiment, the beginning or the end of the third movement trace 231 may connect to the end or the beginning of the first movement trace 210. Specifically, the user moves the stylus to draw the third movement trace 231 outside of the seat image region 232, and then continues to move the stylus to draw the first movement trace 210 without separating the stylus from the display 20 (the detector 30). Thus, the user can move the stylus to draw the third movement trace 231 and the first movement trace 210 as one continuous stroke. As a result, the third movement trace 231 and the first movement trace 210 are easily input into the controller 10.

Note that according to the third embodiment, the beginning or the end of the third movement trace 231 does not have to connect to the end or the beginning of the first movement trace 210. For example, the user can move the stylus to draw the third movement trace 231 outside of the seat image region 232, temporarily separate the stylus from the display 20 (the detector 30), and then move the stylus to draw the first movement trace 210. That is, the user can move the stylus to draw the third movement trace 231 and the first movement trace 210 separately (discontinuously) instead of drawing the traces as one continuous stroke. As a result, for example, the user can draw the first movement trace 210 after drawing the third movement trace 231, and then reaffirming the order to be set for the plurality of seat images 201. Thus, the user can accurately set a convenient order for distributing the plurality of sheets T to the respective seats.

Fourth Embodiment

Figure 15:
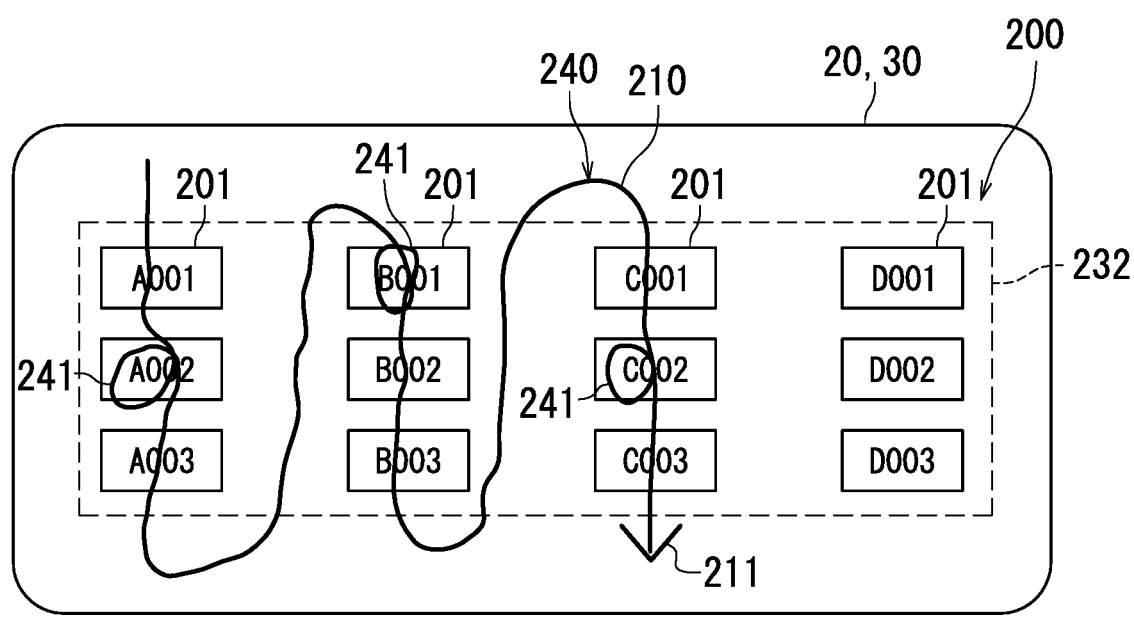
FIG. 15 is a diagram illustrating an example of a composite trace according to a fourth embodiment of the present invention.
Figure 16:
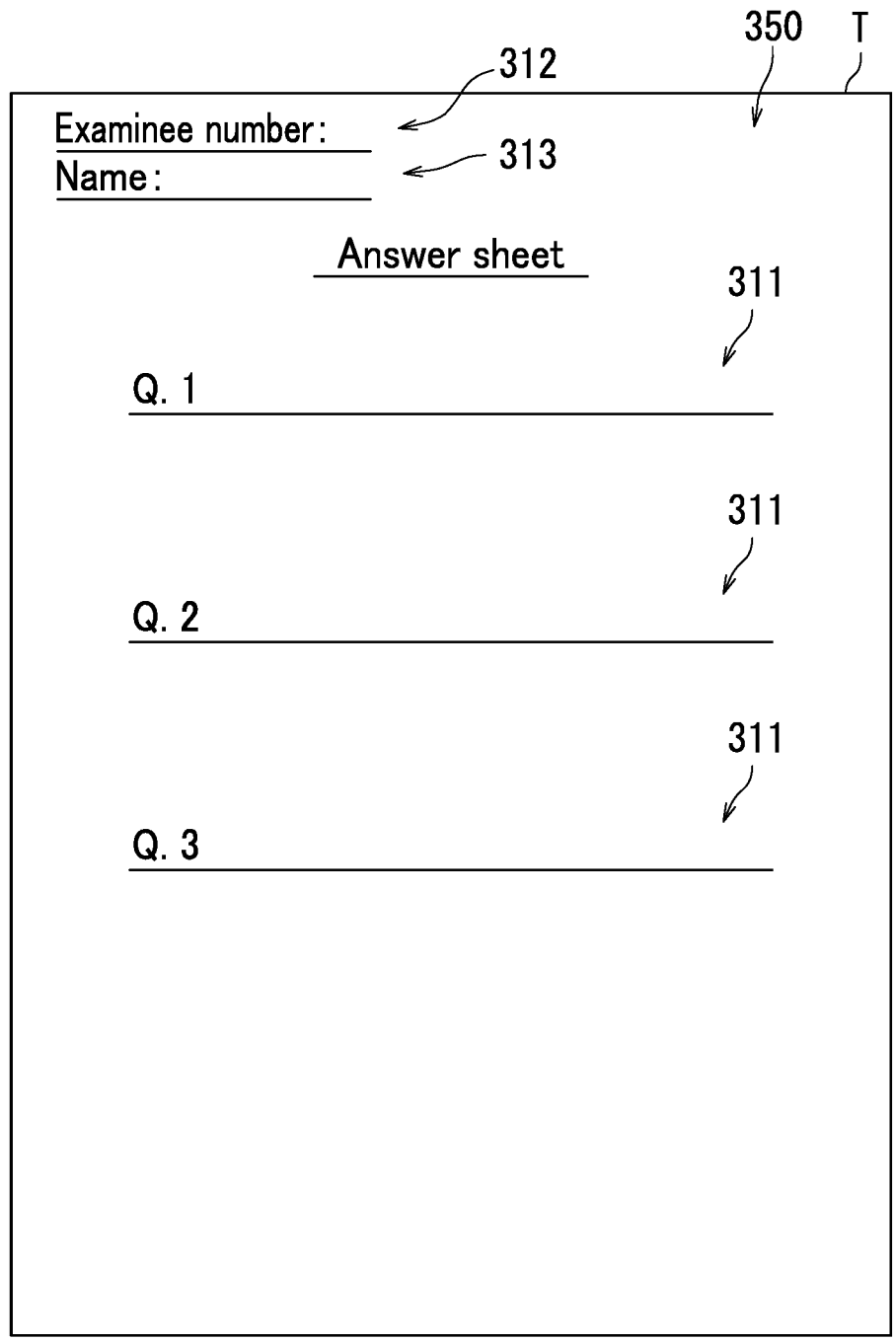
FIG. 16 is a diagram illustrating an example of an object output by an image forming apparatus according to the fourth embodiment of the present invention.

The following describes a fourth embodiment of the present invention with reference to FIGS. 7, 14, and 15 to 19. FIG. 15 is a diagram illustrating an example of a composite trace 240 according to the fourth embodiment. Specifically, FIG. 15 is a diagram illustrating the composite trace 240 drawn on the seating chart image 200 illustrated in FIG. 3. According to the present embodiment, the composite trace 240 includes fourth movement traces 241 and a first movement trace 210. FIG. 16 illustrates an example of an object (a sheet T) output by the image forming apparatus 1 according to the fourth embodiment.

According to the third embodiment, the controller 10 generates output images (image data of the output images) based on the third movement trace 231. According to the fourth embodiment, the controller 10 generates output images (image data of the output images) based on the fourth movement traces 241. The following describes differences between the fourth embodiment and the first to third embodiments.

The detector 30 according to the fourth embodiment further detects the fourth movement traces 241 on the display 20 (the detector 30). The fourth movement traces 241 each mean a movement trace of a stylus within the seat image region 232. The detector 30 transmits signals indicating the detected fourth movement traces 241 to the controller 10.

As illustrated in FIG. 15, the fourth movement traces 241 are drawn within the seat image region 232. Each fourth movement trace 241 is drawn so as to overlap with one seat image 201. Each fourth movement trace 241 has a substantially circular shape. The controller 10 specifies a type of the shape indicated by each fourth movement trace 241 by pattern matching. Specifically, the controller 10 specifies the type of the shape indicated by each fourth movement trace 241 as a circle. According to the present embodiment, the fourth movement traces 241 connect to the first movement trace 210 (i.e., the fourth movement traces 241 and the first movement trace 210 are drawn as one continuous stroke).

The processing section 102 specifies a seat image 201 located inside of any of the movement traces of the stylus as a seat image 201 enclosed by the movement trace (the fourth movement trace 241) of the stylus among the plurality of seat images 201. The processing section 102 performs a third process with respect to the seat images 201 specified to be enclosed by the fourth movement traces 241 among the plurality of seat images 201. The third process is associated with the type of the shape indicated by the fourth movement traces 241. The storage 40 stores therein a table associating data indicating third processes (third process information) with data indicating types of shapes that are indicated by fourth movement traces. The controller 10 reads the third process information from the storage 40 based on the type of the shape indicated by the fourth movement traces 241. The processing section 102 and the image forming section 140 perform the third process indicated by the third process information on the original document image (image data of the original document image) with respect to the seat images 201 specified by the fourth movement traces 241. The third process information is for example a process of deleting a specific character string from the original document image, a process of leaving a specific field blank, or a process of forming no output image on a sheet T.

Figure 17:
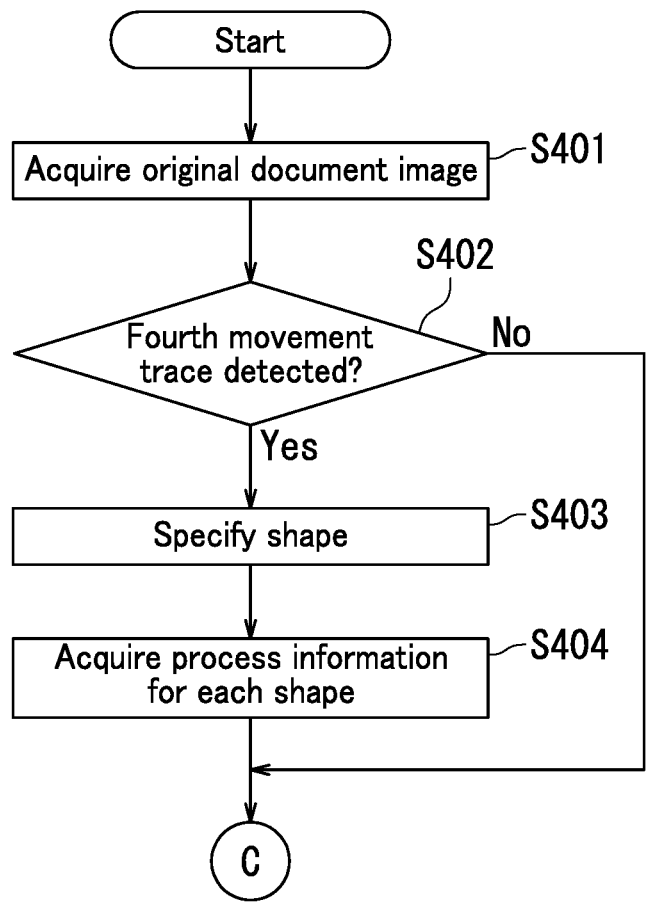
FIG. 17 is a flowchart of an output process according to the fourth embodiment of the present invention.

The following describes an output process according to the fourth embodiment with reference to FIGS. 14, 16, and 17.

As illustrated in FIG. 16, an output image 350 is formed on the sheet T. The output image 350 exhibits one of answer sheets to be distributed to a plurality of seats in a classroom or an examination room. The output image 350 includes a plurality of answer fields 311, an examinee number field 312, and a name field 313. The examinee number field 312 and the name field 313 are blank.

The following describes the output process according to the fourth embodiment with reference to FIGS. 7, 14, and 17. FIG. 17 is a flowchart of the output process according to the fourth embodiment.

In Step S401 in FIG. 17, the controller 10 directs the image reading section 110 to read an original document image from an original document. The processing section 102 acquires the original document image (image data of the original document image) through the image reading section 110 reading the original document image from the original document. According to the present embodiment, the original document image is the same as the output image 350 described with reference to FIG. 16.

In Step S402, the controller 10 determines whether or not the detector 30 has detected a fourth movement trace 241 of a stylus on the display 20 (the detector 30). Specifically, the controller 10 determines whether or not there is a movement trace of the stylus located inside of the seat image region 232 based on a signal transmitted from the detector 30. Upon the controller 10 determining that the detector 30 has not detected any fourth movement trace 241 (No in Step S402), the process advances to Step S302 in FIG. 14. Upon the controller 10 determining that the detector 30 has detected at least one fourth movement trace 241 in Step S402 in FIG. 17 (Yes in Step S402), the process advances to Step S403.

In Step S403, the processing section 102 specifies the type of the shape indicated by the fourth movement trace 241 by pattern matching. Specifically, the processing section 102 specifies the type of the shape indicated by the fourth movement trace 241 as a circle.

In Step S404, the processing section 102 acquires the third process information from the storage 40 based on the type of the shape indicated by the fourth movement trace 241, and then the process advances to Step S302 in FIG. 14. Specifically, in Step S404 in FIG. 17, the processing section 102 acquires the third process information corresponding to the fourth movement trace 241 having a circular shape. According to the present embodiment, the third process corresponding to the circular fourth movement trace 241 is for example a process of including no image exhibiting an examinee number in an output image 350.

The following describes a process to be performed by the controller 10 after determination that the detector 30 has not detected any fourth movement trace 241 (No in Step S402) or after acquisition of the third process information (Step S404). That is, the following describes a process to be performed through Step S302 and the subsequent steps in FIG. 14. In the process to be performed through Step S302 and the subsequent steps, what is performed in Step S106 differs between the fourth embodiment and the first to third embodiments. The following mainly describes the difference between the fourth embodiment and the first to third embodiments.

In Step S106 in FIG. 7, the processing section 102 generates an output image 350 (image data of the output image 350) corresponding to the selected seat image 201. Specifically, as in the first embodiment (see FIG. 6), the processing section 102 performs a process on the original document image (image data of the original document image) so that an examinee number is included in the output image on condition that the selected seat image 201 does not overlap with any fourth movement trace. By contrast, the processing section 102 performs a process on the original document image (image data of the original document image) so that no examinee number is included in the output image as illustrated in FIG. 16 in a situation in which the selected seat image 201 overlaps with the fourth movement trace 241.

As described above with reference to FIGS. 7, 14, and 15 to 17, the image forming apparatus 1 according to the present embodiment can perform fourth processes (processes associated with the types of the shapes indicated by the fourth movement traces 241) with respect to the seat images 201 specified by the fourth movement traces 241 among the plurality of seat images 201. It is therefore possible to form output images 350 so that the output images 350 formed on sheets T to be distributed to the specified seat images 201 are different from the output images 350 formed on sheets T to be distributed to the other seat images 201. As a result, in a situation in which unexpected examinees sit in specific seats, for example, the user can distribute answer sheets having neither images exhibiting examinee numbers nor images exhibiting names formed thereon to the specific seats.

According to the fourth embodiment, the fourth movement traces 241 and the first movement trace 210 are drawn as one continuous stroke. Specifically, the user can move the stylus to draw the fourth movement traces 241 each overlapping with a different seat image 201 while moving the stylus to draw the first movement trace 210.

As described above, the image forming apparatus 1 according to the present embodiment allows the fourth movement traces 241 and the first movement trace 210 to be drawn as one continuous stroke. Thus, the fourth movement traces 241 and the first movement trace 210 can be easily input into the controller 10.

Note that according to the fourth embodiment, the fourth movement traces 241 and the first movement trace 210 do not have to be drawn as one continuous stroke. For example, the user can move the stylus to draw at least one fourth movement trace 241 within the seat image region 232, and then move the stylus to draw the first movement trace 210. That is, the user can move the stylus to draw the fourth movement trace 241 and the first movement trace 210 separately (discontinuously). As a result, for example, the user can draw the first movement trace 210 after drawing the fourth movement trace 241, and then reaffirming the order to be set for the plurality of seat images 201. Thus, the user can accurately set a convenient order for distributing the plurality of sheets T to the respective seats.

Furthermore, the image forming apparatus 1 according to the present embodiment allows a setting for stopping the image forming section 140 from forming an output image on a sheet T (from outputting an object) with respect to a seat image 201 specified by a fourth movement trace 241. As a result, in a situation in which there is an absentee, it is possible to easily distribute a plurality of sheets T to a plurality of seats except a seat for the absentee. An image can be formed on a sheet T and the sheet T can be given to the absentee another day. Alternatively, the output image for the absentee can be sent to the absentee via e-mail.

Furthermore, the processing section 102 may generate an output image exhibiting a translation of the original document with respect to a seat image 201 specified by a fourth movement trace 241. Specifically, the translation of the original document is prepared in advance and image data indicating the translation is stored in the storage 40. The processing section 102 generates an output image based on the image data indicating the translation with respect to the seat image 201 specified by the fourth movement trace 241. The image forming section 140 then outputs a sheet T having the output image exhibiting the translation formed thereon as the sheet T to be given to the seat image 201 specified by the fourth movement trace 41. As a result, it is possible to easily distribute a plurality of sheets T to a plurality of seats, respectively, in a situation in which there are examinees who use Japanese in an examination and an examinee who uses another language in the examination, for example.

Figure 18:
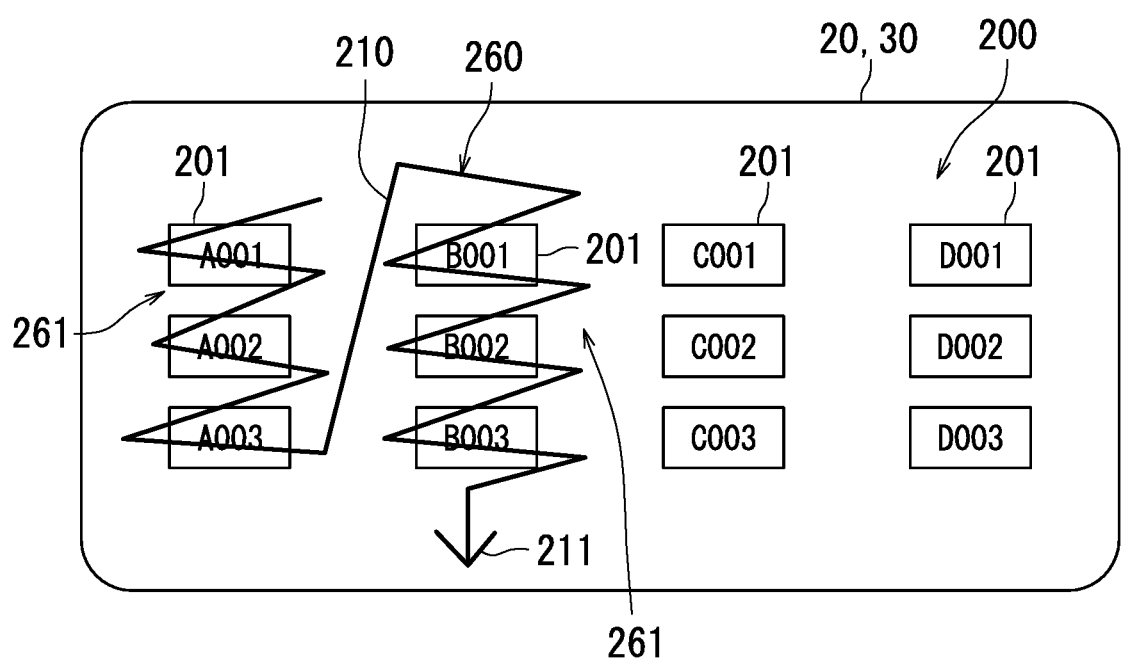
FIG. 18 is a diagram illustrating an example of a composite trace according to the fourth embodiment of the present invention.
Figure 19:
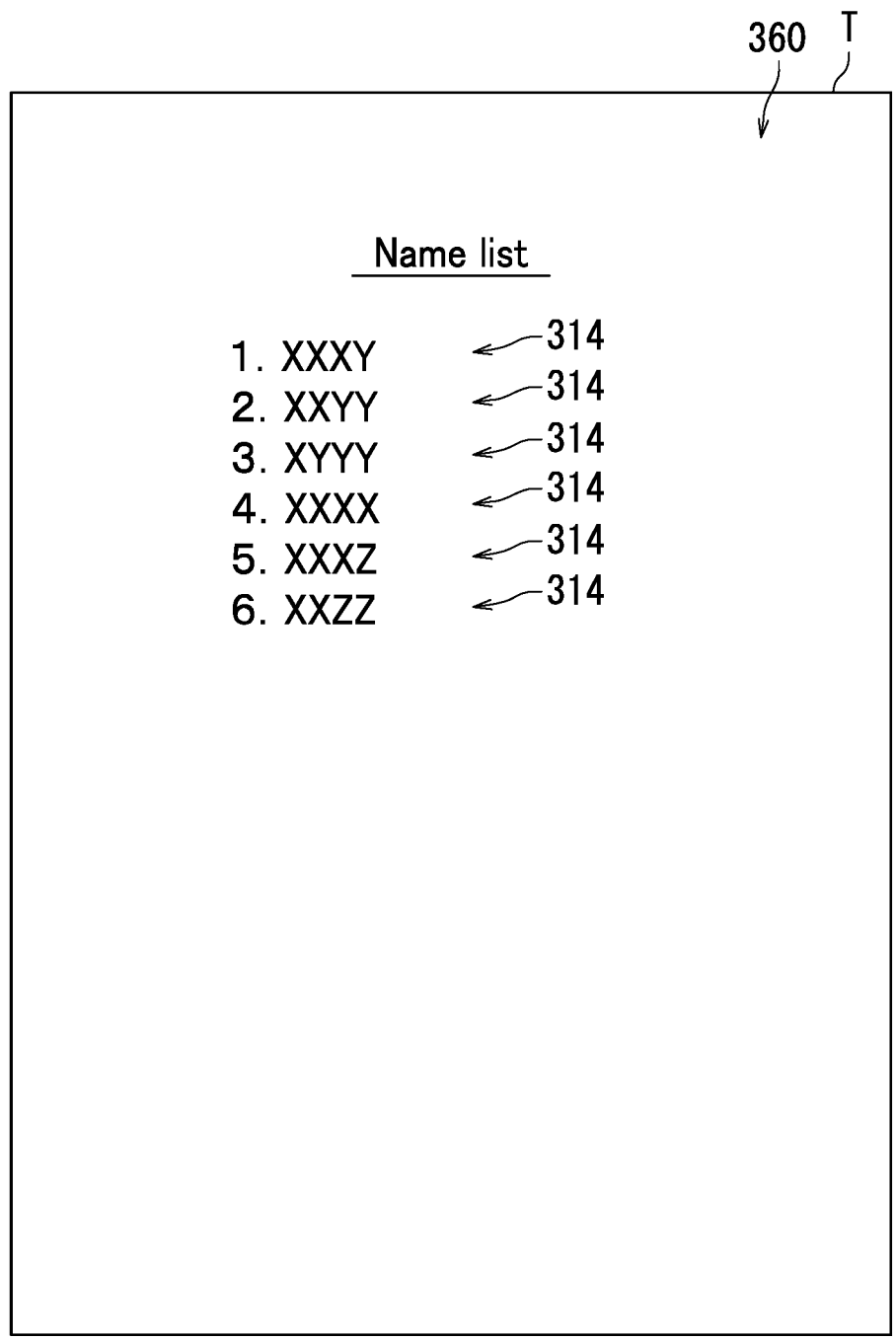
FIG. 19 is a diagram illustrating an example of an object output by an image forming apparatus according to a variation of the fourth embodiment of the present invention.

Furthermore, the processing section 102 can create a list of the identification information. The following describes a list creation process to be performed by the controller 10 with reference to FIGS. 18 and 19. FIG. 18 illustrates an example of a composite trace 260 according to the fourth embodiment. Specifically, FIG. 18 is a diagram illustrating the composite trace 260 drawn on the seating chart image 200 illustrated in FIG. 3. The composite trace 260 includes fourth movement traces 261 and a first movement trace 210. FIG. 19 illustrates an example of an object (a sheet T) output through the list creation process.

As illustrated in FIG. 18, the display 20 displays the composite trace 260 with the seating chart image 200 including the plurality of seat images 201 in response to the user moving the stylus to draw zigzag lines that pass through two or more of the seat images 201 on the display 20 (the detector 30). According to the present embodiment, the fourth movement traces 261 and the first movement trace 210 are drawn as one continuous stroke. More specifically, the first movement trace 210 includes the fourth movement traces 261. The fourth movement traces 261 are equivalent to zigzag line parts of the first movement trace 210. The determination section 101 determines an order of the seat images 201 based on the first movement trace 210. The processing section 102 acquires from the storage 40 the identification information of individuals corresponding to the seat images 201 specified by the fourth movement traces 261 among the plurality of seat images 201 to create a list of the identification information. A listing order of the identification information of the individuals in the list conforms to the order determined by the determination section 101.

As illustrated in FIG. 19, an output image 360 is formed on the sheet T. The output image 360 exhibits a name list including a plurality of name images 314. The name images 314 exhibit names, which are the identification information of the individuals.

As described above with reference to FIGS. 18 and 19, the image forming apparatus 1 according to the present embodiment can create a list including identification information of individuals corresponding to seat images 201 specified by the fourth movement traces 261 among the plurality of seat images 201.

Embodiments of the present invention have been described above with reference to the drawings (FIGS. 1 to 19). The image forming apparatus 1 according to the above embodiments detects a first movement trace of a detection target on the display (the detector) and determines an order of a plurality of seat images based on the first movement trace. Thus, the image forming apparatus 1 according to the above embodiments allows setting of an output order that facilitates distribution of a plurality of sheets to a plurality of seats, respectively.

It should be noted that the present invention is not limited to the above embodiments and can be practiced in various ways within the scope not departing from the gist of the present invention (for example, in (1) below). The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, properties of elements of configuration described in the above embodiments, such as shape and dimensions, are merely examples and are not intended as specific limitations. Various alterations may be made so long as there is no substantial deviation from the effects of the present invention.

(1) According to the embodiments of the present invention, the first movement trace 210 means a movement trace of a detection target that has moved so as to pass through two or more seat images 201. Specifically, the detector 30 detects a trace of a stylus that moves on the display 20 (the detector 30) as the first movement trace 210. The present invention is not limited as such, and the first movement trace 210 may be a movement trace of an object (for example, a cursor) displayed on the display 20 and moved on the display 20 (the detector 30). The displayed object is for example movable on the display 20 through operation of a numeric keypad or arrow buttons in the operation section of the image forming apparatus 1. The movement trace of the displayed object moved through operation of the numeric keypad or the arrow buttons is then input into the controller 10 as the first movement trace 210. Note that a movement trace of the displayed object moved through operation of the numeric keypad or the arrow buttons may be input into the controller 10 as a second movement trace 250, a third movement trace 231, or a fourth movement trace 241.

INDUSTRIAL APPLICABILITY

The present invention relates to display devices and image forming apparatuses, and is industrially applicable thereto.

The invention claimed is:

1. An image forming apparatus comprising:
a display configured to display an image exhibiting a seating chart including a plurality of seat images;
a detector configured to detect a first movement trace of a detection target on the display;
a determination section configured to determine an order of the plurality of seat images based on the first movement trace;
a processing section configured to process an original document image to generate a plurality of output images respectively corresponding to the plurality of seat images; and
an image forming section configured to form the plurality of output images on a plurality of sheets, respectively, in accordance with the order determined by the determination section, wherein
at least two output images of the plurality of output images are at least partially different from each other.

2. The image forming apparatus according to claim 1, wherein
the first movement trace is a movement trace of the detection target that has moved to pass through the plurality of seat images, and
the determination section determines the order of the plurality of seat images based on an order of the passage of the detection target through the plurality of seat images.

3. The image forming apparatus according to claim 1, further comprising
storage that stores therein a table associating identification information of individuals with the plurality of seat images, wherein
the processing section processes the original document image so that the plurality of output images include the identification information.

4. The image forming apparatus according to claim 1, wherein
the detector detects a second movement trace of the detection target on the display,
the second movement trace is a movement trace of the detection target that has moved to enclose two or more of the plurality of seat images, and
the processing section performs a process associated with a type of a shape indicated by the second movement trace on the original document image to generate output images with respect to the two or more seat images.

5. The image forming apparatus according to claim 1, wherein
the detector detects a third movement trace of the detection target on the display,
the third movement trace is a movement trace of the detection target located outside of a region of the display in which the plurality of seat images are displayed, and
the processing section performs a process associated with a type of a shape indicated by the third movement trace.

6. The image forming apparatus according to claim 5, wherein
a beginning or an end of the third movement trace connects to an end or a beginning of the first movement trace.

7. The image forming apparatus according to claim 1, wherein
the detector detects a fourth movement trace of the detection target on the display,
the fourth movement trace is a movement trace of the detection target located inside of a region of the display in which the plurality of seat images are displayed, and
at least one of the processing section and the image forming section performs a process associated with a type of a shape indicated by the fourth movement trace with respect to a seat image specified by the fourth movement trace among the plurality of seat images.

8. The image forming apparatus according to claim 7, further comprising
storage that stores therein a table associating identification information of individuals with the plurality of seat images,
the processing section creates a list of the identification information,
the list includes the identification information associated with at least one of the plurality of seat images, and
the at least one seat image is a seat image specified by the fourth movement trace among the plurality of seat images.

9. The image forming apparatus according to claim 1, further comprising
a reading section configured to read an image exhibiting the seating chart from an original document.

* * * * *